(12) United States Patent
Ohnstad et al.

(10) Patent No.: US 7,678,453 B2
(45) Date of Patent: Mar. 16, 2010

(54) MULTI-FUNCTION SURFACE-COATING FIRE AND FUEL-LEAKAGE INHIBITION

(75) Inventors: Thomas S. Ohnstad, Salem, OR (US); Russell A. Monk, Salem, OR (US); Michael R. Dennis, Scappoose, OR (US)

(73) Assignee: High Impact Technology, LLC, Tigard, OR (US)

( * ) Notice: Subject to any disclaimer, the term of this patent is extended or adjusted under 35 U.S.C. 154(b) by 309 days.

(21) Appl. No.: 11/543,651

(22) Filed: Oct. 4, 2006

(65) Prior Publication Data

US 2007/0160827 A1     Jul. 12, 2007

Related U.S. Application Data

(60) Provisional application No. 60/724,236, filed on Oct. 5, 2005, provisional application No. 60/726,365, filed on Oct. 12, 2005, provisional application No. 60/728,190, filed on Oct. 18, 2005.

(51) Int. Cl.
*B32B 5/16* (2006.01)
*B32B 17/10* (2006.01)

(52) U.S. Cl. .................................. 428/409; 428/331

(58) Field of Classification Search ................ None
See application file for complete search history.

(56) References Cited

U.S. PATENT DOCUMENTS

| | | | |
|---|---|---|---|
| 3,509,016 A | 4/1970 | Underwood et al. | |
| 3,698,587 A | 10/1972 | Baker et al. | |
| 3,726,829 A | 4/1973 | Sayles | |
| 3,801,425 A | 4/1974 | Cook | |
| 4,115,616 A | 9/1978 | Heitz et al. | |
| 4,216,803 A | 8/1980 | Hall | |
| 4,218,502 A | 8/1980 | Graham et al. | |
| 4,273,879 A | 6/1981 | Langer et al. | |
| 4,345,698 A | 8/1982 | Villemain | |
| 4,422,561 A | 12/1983 | Grosvenor et al. | |
| 4,492,779 A | 1/1985 | Junior et al. | |
| 4,552,070 A | 11/1985 | Langer | |
| 4,599,369 A | 7/1986 | Malcolm-Brown | |
| 4,728,711 A | 3/1988 | Rosthauser et al. | |
| 4,952,615 A | 8/1990 | Welna | |
| 5,531,256 A | 7/1996 | Hashimoto et al. | |
| 5,821,284 A | 10/1998 | Graham et al. | |
| 6,358,580 B1 | 3/2002 | Mang et al. | |
| 7,169,452 B1 * | 1/2007 | Monk et al. | 428/35.7 |
| 2003/0220417 A1 | 11/2003 | Guillot et al. | |

FOREIGN PATENT DOCUMENTS

JP          1273703      11/1989
WO     WO 90/14222     11/1990

* cited by examiner

*Primary Examiner*—Sheeba Ahmed
(74) *Attorney, Agent, or Firm*—John M. Dickinson, PC; Robert D. Varitz, PC

(57) ABSTRACT

Barrier structure for furnishing, selectively and variously, penetration and fire-threat protection on the outside surface of a target structure. The barrier structure includes a high-elastomeric coating having an inner face bonded to such a surface, an exposed outer face, and, within this coating, at least one elastomeric layer region extending to the outer face, and containing an embedded distribution of intumescence elements. Basic variations of this structure include (a) an additional layer region which is formed with elastomeric-material including an embedded distribution of liquid-imbiber beads, and (b) an additional layer region which is formed purely of elastomeric material. The elastomeric material employed, and the embedded liquid-imbiber beads where included, react to liquid petroleum-based substances (1) to imbibe such liquid, (2) to swell in size as a result of such imbibing, and (3) to coagulate into a sticky mass.

5 Claims, 4 Drawing Sheets

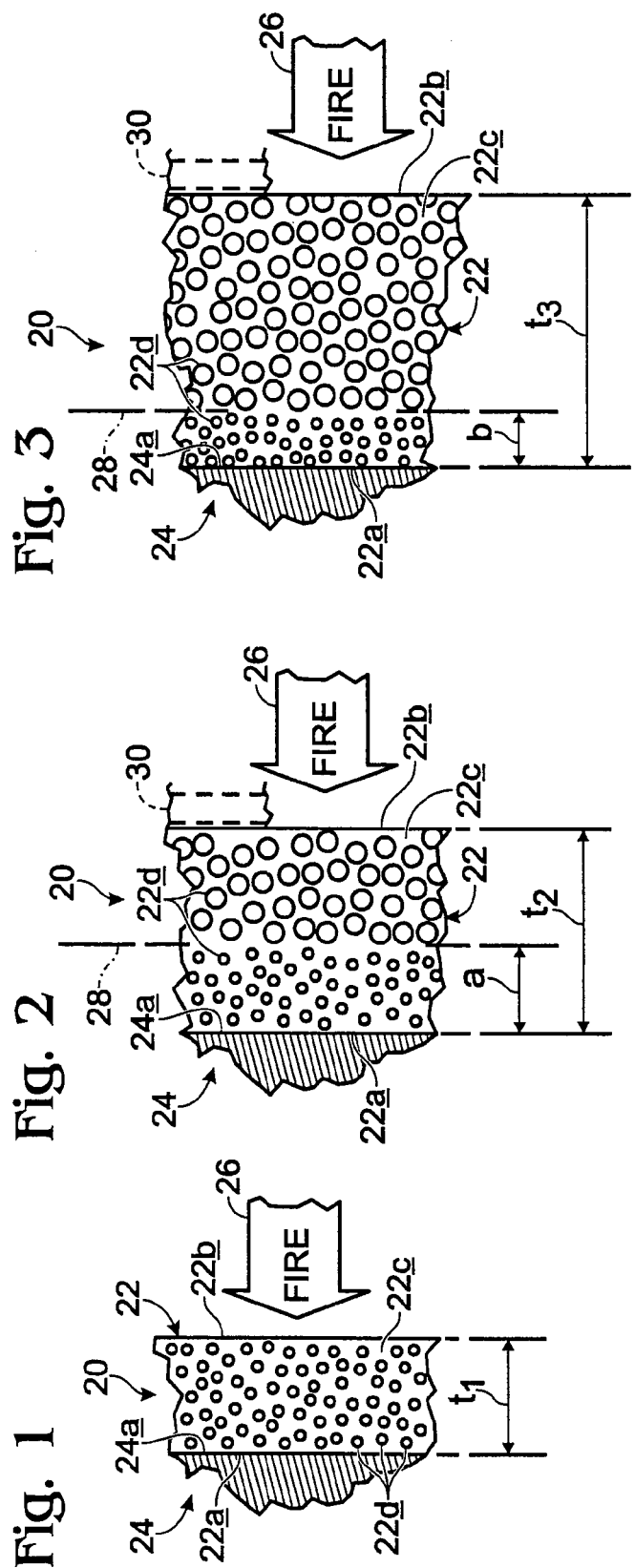

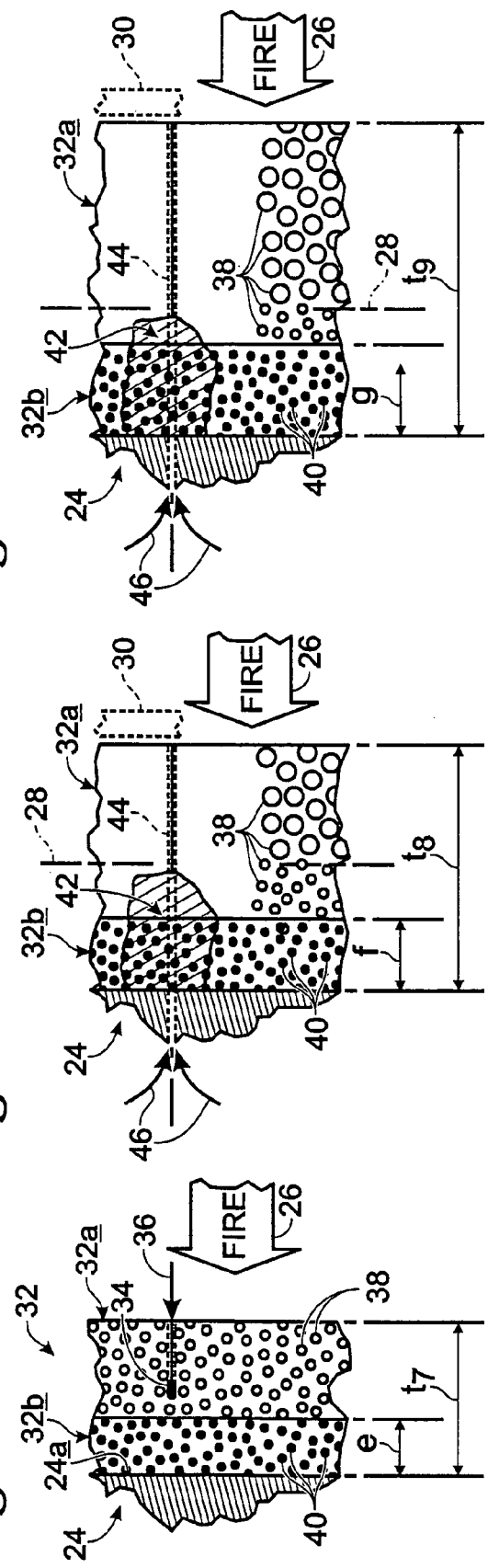

MULTI-FUNCTION SURFACE-COATING FIRE AND FUEL-LEAKAGE INHIBITION

CROSS REFERENCE TO RELATED APPLICATIONS

This application claims priority to three U.S. Provisional Patent Applications including application Ser. No. 60/724,236, filed Oct. 5, 2005, for "Surface Coating Fire Inhibition", application Ser. No. 60/726,365, filed Oct. 12, 2005, for "Anti-Fire, Anti-Ballistic, Dual-Mode Barrier Coating", and application Ser. No. 60/728,190, filed Oct. 18, 2005, for "Surface-Reaction-Coating Fire Protection". The entire disclosure contents of these three provisional applications are hereby incorporated herein by reference.

BACKGROUND AND SUMMARY OF THE INVENTION

This invention relates to surface-treatment barrier coating to provide protection against fire, and where appropriate against flammable fuel leakage, in relation to various fire-vulnerable structures, such as (a) structural steel columns, (b) structural steel beams, (c) wooden (or other) building-structure framing, (d) petroleum-based fuel containers (fuel tankers, pipelines, fuel storage tanks, etc.), (e) composite structures, such as composite armor structures, and (f) other like structures.

There are various fire-risk settings where crucial structures, including petroleum based fuel containers, such as those just generally mentioned above, can be threatened with destruction as a consequence of uncontrollable combustion. Good illustrations include (a) what took place in New York City on Sep. 11, 2001 where surface heating of structural columns led to column failure and devastating collapse of the World Trade Center Towers, and (b) the results of a recurrent tactic which has been employed widely in a current Middle East combat theater involving puncturing of the walls in petroleum-based fuel containers to create fuel leaks which then are intentionally ignited to create catastrophic and life-threatening fires. There are, of course, many other good illustrations of settings wherein the present invention can offer special utility.

The present invention takes aim at thwarting these kinds of events. It does so by proposing the creation of a sprayed-on, high-elastomeric-material coating which, in addition to containing an appropriate, tenacious, high-elastomeric material which offers special functionality as will be explained herein shortly, also at least includes, in an outer portion of such a coating, a distributed population of intumescence elements, such as sodium silicate crystals.

In an embodiment of the invention including simply the mentioned high-elastomeric material, and an appropriate distribution of intumescence elements, when this coating becomes exposed to high heat, such as a nearby fire, the intumescence elements rapidly react to such heat by expanding in an explosive, pop-corn like manner, thus to swell the thickness of the coating quickly in order to grow a significantly thickening heat-insulative barrier on a coated surface. With the mentioned high-elastomeric material effectively employed as an embedding material relative to the intumescence elements, this material enhances the resulting thickness "growth" behavior of the overall protective coating by holding together the expanded crystals as a promotion to coating thickening. Such an elastomeric material especially adds to the protective nature of this invention by enabling the progressive "growing" of coating thickness as outside fire heat continues progressively to raise, to intumescence "popping" temperature, sodium silicate crystals initially "un-triggered" because of their being deeply embedded in the embedding high-elastomeric material.

With such an embodiment of the invention, the first crystals to "pop", and thus to begin effective coating-layer thickness growth, are those disposed near the outside of the coating relative to the structure on which the coating has been applied. As the coating thickness increases, and as "deeper" crystals eventually "rise" to popping temperature, there occurs, as one can appreciate, a significant, progressive enlargement of the depth (i.e., thickness) of the coating, which thus responds dynamically to inhibit protected-surface combustion by "driving" the heat of fire more distantly away from this surface.

Another fire-protective mechanism which is employed by the coating proposed by the present invention relates to an outer surface heat reaction which takes place whereby, shortly after the intense heat of a fire has been applied to the outside of the coating, and the coating has begun to respond with swelling intumescence behavior, there develops a heavy flow, somewhat like a blanket, of soot-infused smoke which, only for a relatively short period of time, is accompanied by the usual and expected powerful smell of "burning activity". In other words, an emission of a blanket of such smoke has been observed to come from initial burning of the high-elastomeric material employed in the coating of the invention in a manner which, apparently, quickly creates a burned condition that thereafter "refuses" to furnish additional elastomeric material "fuel" for burning. In other words, coating elastomeric material burning appears to stop, per se, quite rapidly. An important consequence is that the body of elastomeric material stays together sufficiently to support the ever-thickening, protective growth of the coating.

Yet another important protective mechanism, dual-featured in nature, which is provided by the coating of this invention relates to the fact that the high-elastomeric material chosen for the coating is (a) a liquid-imbibing material which (b) also reacts chemically with petroleum-based fuel in what has been found to be a very useful coalescence way. This dual-feature mechanism is observed under circumstances where the coating has been applied to the outside surface of a wall-punctured, flammable petroleum-based fuel container, such as a transportable fuel tanker, or a fuel pipeline, as illustrations. If some aggressive activity causes a penetration, as by a bullet wound, through the coating of this invention, and also through a coating-protected fuel-container wall, resulting leaking petroleum-based fuel causes an imbibing and swelling reaction to take place with regard to the exposed and fuel-contacted elastomeric material, with a resulting congealing action occurring to create a sticky and tacky continuous mass which tends very quickly to close such a wound against further leakage. The elastomeric nature of the elastomeric material employed in the coating of this invention cooperates with this imbibing, chemically-reactive and congealing action to apply mechanical sealing pressure also to a puncture wound in the region around the congealing mass of reacted-with material.

Still a further protective approach proposed by the present invention includes creating a coating of the type generally mentioned above which additionally includes a layer region containing elastomeric-material-embedded, fuel-reactive, liquid-imbiber beads which function especially well at imbibing leakage petroleum-based fuel, and swelling greatly in size to furnish yet another puncture-wound sealing mechanism. These included imbiber beads also exhibit the kind of reactive congealing just mentioned above herein with respect to the embedding high-elastomeric material.

These and other various advantages and protection opportunities which are afforded by the present invention will become more fully apparent as the detailed description of the invention which now follows is read in conjunction with the accompanying drawings.

DESCRIPTION OF THE DRAWINGS

FIGS. 1, 2 and 3 have a time-sequence relationship with respect to one another, with FIG. 1 illustrating an earlier point in time, and FIGS. 2 and 3 illustrating progressively later points in time, regarding reaction to fire by an invention-coating embodiment wherein the coating includes simply a main body, or mass, of high-elastomeric material in which there is a large embedded population of intumescence elements.

FIGS. 7, 8 and 9, which are also related to one another in the same kind of time sequence which characterizes FIGS. 1-3, inclusive, and FIGS. 4-6, inclusive, specifically illustrate yet another embodiment of the invention which includes, within the illustrated coating, a layer region of high-elastomeric material which contains embedded liquid-imbiber beads of the type just generally discussed above herein.

Figure 6:
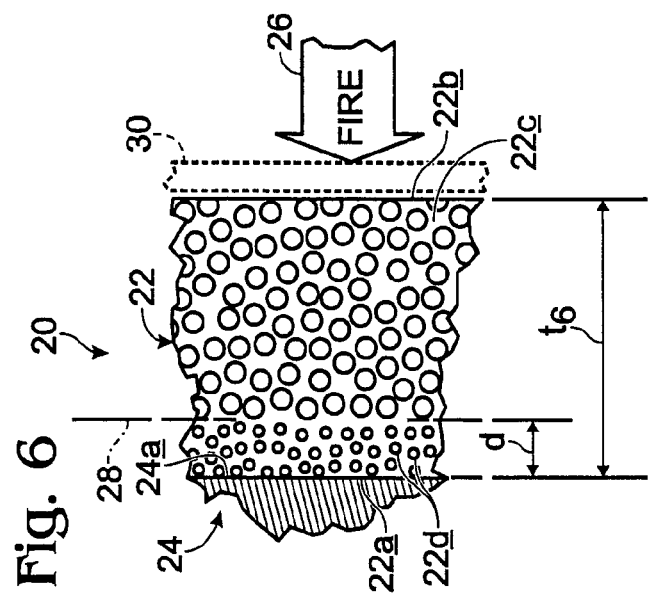
FIGS. 4, 5 and 6 are also related to one another in a time-sequence manner, progressing from FIG. 4 through FIG. 5 to FIG. 6, illustrating a coating embodiment of the invention which is essentially the same as that illustrated in FIGS. 1-3, inclusive, but with these three figures emphasizing the outside created soot-filled smoke blanket fire-reaction behavior of the illustrated coating, as discussed briefly above in the background and summary portion of this specification.

Structures presented in the several above-identified drawing figures are not necessarily drawn to scale.

DETAILED DESCRIPTION OF THE INVENTION

Turning now to the drawings, and referring first of all to FIGS. 1-3, inclusive, indicated generally at 20 is what is referred to herein as penetration and fire-threat protecting barrier structure which includes a combined elastomeric and intumescence coating 22 which has been applied by spraying onto the outside surface 24a of a target structure 24 which might typically be an elongate steel column or beam which forms part of a beam-and-column structural building frame (not specifically illustrated herein per se). In the embodiment of the invention which is now being described, coating 22 is a single-layer, or single-layer-region, coating with a nominal thickness $t_1$ of about ⅛-inches.

Regarding dimension $t_1$, it should be understood that this particular, initial, stated, coating-thickness size—a size which forms a useful basis for further disclosure of the invention herein—is presented simply for illustration purposes, and may differ for different applications, depending on the specific fire time rating which is intended to be "met" by coating 22. Accordingly, initial coating thickness for coating 22 is freely a matter of "designer" choice.

Coating 22 possesses an inner face 22a which is adhesion-bonded to target surface 24a, and an exposed outer face 22b which, in FIG. 1, is about to be exposed to an external fire represented by a broad arrow 26.

Coating 22 is formed with an elastomeric body 22c which contains an embedded, and substantially uniform distribution of intumescence elements 22d. These elements preferably occupy about 30% to about 50% by volume of the total volume of coating 22. In the particular illustration now being given, elements 22d occupy about 50% of the overall volume of coating 22. One should note that, while the distribution for elements 22d pictured and specifically described herein is stated to be a substantially uniform distribution, it need not be so for all applications of the invention. For example, a pre-determined, non-uniform distribution, such as a pre-selected density-gradient distribution, could readily be selected for use, and implemented therefor, in another kind of setting.

The elastomeric material which makes up body 22c is formed of a high-elastomeric material sold under the trademark TUFF STUFF®FR made by Rhino Linings USA, Inc. in San Diego, Calif. This material which, as has been mentioned, has been applied to target surface 24a, is specifically a chemically curable blend of a two-part mixture of precursor materials which, when first sprayed, initially and collectively take the form of a very sticky and tacky material which bonds adhesively and tenaciously to surface 24a. This material, when fully cured, has an elasticity which allows it to be stretched up to about 300% to about 400% in a fully elastic mode.

Intumescence elements 22d preferably take the form herein of sodium silicate crystals which have a mesh size of about 100-mesh. These crystals, when exposed to intense heat with a temperature of about 500-degrees F, respond with a rapid, popping, volumetric expansion which causes, effectively, a resulting thickening of coating 22. More will be said about this temperature-response, intumescence behavior shortly.

In the embodiment of the invention which is pictured in FIGS. 1-3, inclusive, the entire structure of coating 22 is referred to herein as being a single-layer region which extends between its own outer surface 22b and the location (coating face 22a) of surface-adhesion contact with target surface 24a. In this single-layer-region manner of thinking about coating 22, this region is said to be "coextensive" with coating 22.

As was mentioned earlier hereinabove, the condition of coating 22 immediately prior to being exposed to the heat of an external fire is pictured in FIG. 1. FIGS. 2 and 3 illustrate two different physical conditions of coating 22 after exposure to the fire represented by arrow 26. The condition pictured in FIG. 2 reflects the status of coating 22 shortly after its outside surface has been heated to a temperature of about 500-degrees F, in relation to which condition intumescence popping and expanding behavior has begun. FIG. 3 shows the condition of coating 22 at a later point in time.

In FIG. 2, the overall thickness of layer 22 is seen to have increased to have a thickness $t_2$ which is greater than previously thickness $t_1$, and specifically herein about 3/16-inches. The vertical dash-dot line 28 which appears in FIG. 2, and which is shown at a certain location intermediate surfaces 22b, 24a, represents what can be thought of as being a temperature plane (a popping temperature plane) of intumescence behavior which represents a temperature rise within coating 22, at the location of this plane, to the 500-degree F. intumescence popping temperature mentioned above. In FIG. 2, this popping-temperature plane is spaced from target surface 24a by the dimension shown at a in FIG. 2, which dimension might be about 3/32-inches.

Appearing now in FIG. 2, but not present in FIG. 1, and represented by a fragmented, dashed outline 30, is a blanket of soot-infused smoke which has resulted from the beginning of burning of elastomeric material 22c. More will be aid about this smoke blanket shortly.

In FIG. 3 which, as mentioned above, represents a point later in time than that shown in FIG. 2, one can see that the overall thickness of coating 22 has grown to an even greater dimension $t_3$ with intumescence-temperature popping plane 28 having shifted to a distance b from target surface 24a—a distance which is less than previously mentioned distance a pictured in FIG. 2. Dimension $t_3$ herein might be about 1/4-inches, and dimension b might be about 1/16-inches.

Sooted smoke blanket 30 is also pictured in fragmented, dashed outline in FIG. 3.

Thus what is pictured with emphasis in FIGS. 1-3, inclusive, is one form of the coating of the present invention in terms principally associated with an elastomeric-intumescence response to an external fire to provide protection from that fire for target structure 24 through the mechanism of swelling and growing of the overall thickness of layer 22. It might be typical that sodium silicate crystals having a nominal 100-mesh starting size grow in volume to about twice that size when exposed to the mentioned intumescence popping temperature of about 500-degrees F. The high-elastomeric nature of elastomeric body 22c accommodates such growth by keeping coating 22 essentially intact while at the same time accommodating thickness growth in coating 22 by virtue of the intumescence behavior of elements, or crystals, 22d.

Figure 5:
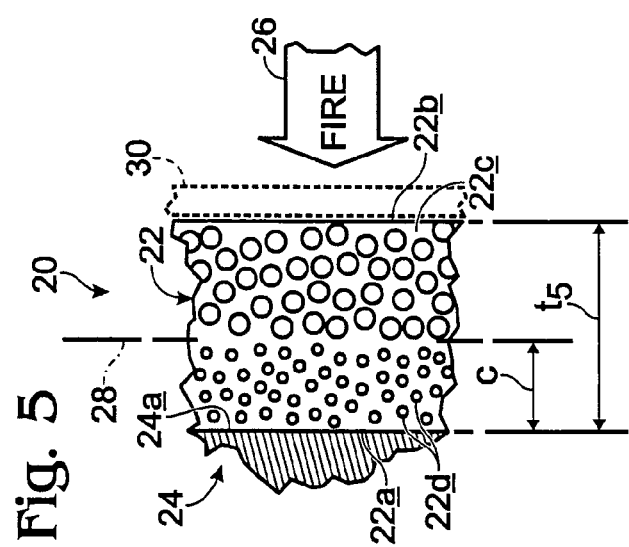
Figure 4:
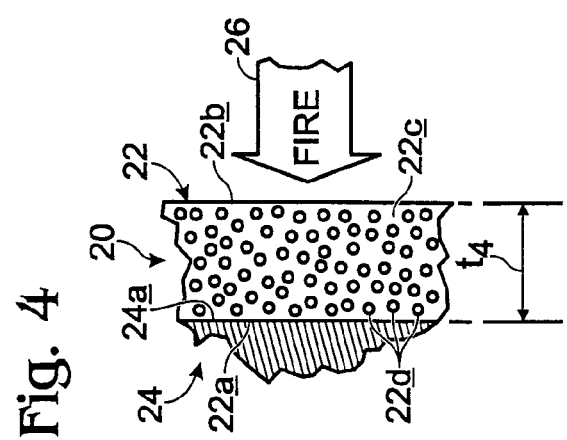

Turning attention now to FIGS. 4-6, inclusive, these three figures are employed principally to describe, in relation to the same coating shown in FIGS. 1-3, inclusive, the nature of above-mentioned sooted smoke blanket 30. The same reference numerals which are employed to identify various structures, etc., appearing in FIGS. 1-3, inclusive, are repeated in FIGS. 4-6, inclusive. However, in FIGS. 4-6, inclusive, sooted blanket 30 is shown extending entirely across the fragmentarily shown outer surface 22b in coating 22.

In FIG. 4, the condition of coating 22 is essentially the same at that illustrated in FIG. 1, with the dimension $t_4$ being used to illustrate in this figure the nominal "starting" thickness of coating 22 which is about 1/8-inches. In FIG. 5, overall layer thickness has grown to dimension $t_5$ which is the same dimension of about 3/16-inches represented at $t_2$ in FIG. 2. Intumescence-temperature popping plane 28 is shown lying at a distance c from target surface 24a. Dimension c is about 3/32-inches, and corresponds to dimension a pictured in FIG. 2. In FIG. 6, the overall thickness of coating 22 has grown to the dimension shown at $t_6$ which has a dimension of about 1/4-inches, and which corresponds to dimension $t_3$ in FIG. 3. Here, intumescence-temperature popping plane 28 is shown at a distance d from target surface 24a—a distance of about 1/16-inches, which corresponds to the distance shown at b in FIG. 3.

Thus, the same kind of intumescence coating swelling for fire protection described above in relation to FIGS. 1-3, inclusive, also takes place as illustrated in FIGS. 4-6, inclusive.

Sooted blanket 30 develops shortly after the outer surface of coating 22, and specifically the outer surface of elastomeric body 22c, has become heated to combustion by the outside fire represented by arrow 26. The development and existence of this sooted blanket seems, as observed, to add an important fire-protection behavior. Very specifically, this observed and believed form of fire protection appears to come as a reaction which takes place shortly after the intense heat of fire has been applied to coating 22. Specifically, it appears that this resulting, soot-infused blanket, which is accompanied, somewhat oddly, by the attendant soon-disappearance of the smell of burning activity, develops as a consequence of the apparent phenomenon that elastomeric material 22c, after initial surface combustion, has begun to deny combustion "fuel" for the attacking fire. In other words, and very counter-intuitively, it appears as if the integrity of the outside portion of elastomeric body 22c stays relatively intact, thus to "support" the continual, intumescence-driven thickening of coating 22, rather than being progressively consumed and diminished—a behavior which would cause coating 22 to diminish in thickness. While we are not very certain about the exact mechanism of this observed fire-protection behavior, it appears to have characteristics of a chemical reaction, such as a catalytic-conversion reaction, which operates surprisingly to preserve the important tendency of coating 22 to stay relatively well intact, and to continue to grow in thickness.

One additional way of expressing the apparent behavior of this smoke phenomenon is that it acts as a toward-the-fire-intervening sooted smoke blanket which has a fire-suppression characteristic.

FIGS. 7, 8 and 9 show a modified form of the invention wherein a dual-layer-region, spray-applied protective coating 32 has been applied to target surface 24a, with this coating possessing first and second layer regions 32a, 32b, with layer region 32b lying between layer region 32a and target surface 24a. In FIGS. 7, 8 and 9, target surface 24a here represents the outside surface of the wall in a petroleum-based fuel container 24 which is intended to be protected not only against fire, but also against leakage-producing penetration, such as penetration by the bullet shown at 34 in FIG. 7. In FIG. 7, bullet 34 is shown in a condition having partially penetrated coating 32 in the direction of arrow 36 in FIG. 7.

Both of layer regions 32a, 32b are formed with bodies of high-elastomeric material which is essentially the same high-elastomeric material as that described earlier herein. The elastomeric body of this material included in layer region 32a carries an embedded, substantially uniform distribution of intumescence elements (sodium silicate crystals) 38, and the body of elastomeric material included in layer region 32b carries an embedded, substantially uniform distribution of liquid-imbiber beads, or elements, 40. Elements 40 herein take the form of a product identified with the product designator IMB230300 made by Imbibitive Technologies America, Inc. in Midland, Mich. Intumescence elements 38 in layer region 32a occupy about 50% of the volume of this layer region, and imbiber beads 40 occupy about 20% to about 30% by weight of the overall make-up of layer region 32b. As was mentioned earlier herein for the distribution selectable for embedding of intumescence elements, the same thoughts apply to selectability for the distribution characteristic of embedded, liquid-imbiber beads.

Imbiber beads 40, as is also true for the high-elastomeric material mentioned herein, react to contact with petroleum based fuel with imbibing of such fuel, with swelling in volume, and also with the forming of a coagulation mass, such as the coagulation mass shown as a shaded zone generally at 42 in FIGS. 8 and 9. Coagulation mass 42 is contributed to both by the imbiber beads With respect to the fire-protection behavior provided by coating 32 in FIGS. 7, 8 and 9, FIG. 7 illustrates the condition of coating 32 before the fire (which is represented by arrow 26) has begun to apply heat to the coating, and in this circumstance, the overall, nominal coating thickness is shown $t_7$ which has a dimension of about ¼-inches, with layer region 32b having a thickness of about ⅛-inches, represented by e in FIG. 7. In FIG. 8, overall coating thickness has grown to the dimension shown at $t_8$ which is about 11/32-inches, with a modest amount of thickening, to a dimension of about 5/32-inches, being shown at f for the thickness of layer region 32b. In FIG. 9 the overall thickness of coating 32, at least in the vicinity of the penetration wound (soon to be more fully discussed) resulting from bullet 34, has grown to the dimension shown at $t_9$ which is about 7/16-inches, with the overall thickness of layer region 32b here being shown at g which has a dimension of about 3/16-inches.

Swelling of the thickness of coating 32 as pictured in FIGS. 8 and 9 is due to two different mechanisms. One of these mechanisms involves the intumescence behavior (previously described, in relation to the behavior of intumescence elements 22d) of intumescence elements 38 as intumescence-temperature popping plane 28 moves inwardly toward target surface 24a. The second mechanism of thickening results from thickening of layer region 32b by virtue, as will shortly be explained, of contact of both the elastomeric material in this layer region, and the liquid-imbiber beads embedded therein, having imbibed leaking petroleum-based fuel which has come in contact with the two materials that make up layer region 32b.

In FIG. 7, and as was mentioned earlier, a bullet 34 has been fired at container 24 for the purpose of penetrating the wall in that container, and causing a leak of combustible fuel. If and when bullet 34 passes through the entirety of coating 32, and into structure 24 to create a leakage path 44, as fuel begins to leak from the puncture wound which is thereby created, such leakage being indicated by curved arrows 46 in FIGS. 8 and 9, leakage fluid comes into contact with the two materials making up layer region 32b, causing these materials to imbibe that liquid, and to swell and coagulate to form a very quickly attained positive seal against fluid leakage. As was mentioned earlier, a coagulation mass, as just mentioned, is illustrated at 42 in FIGS. 8 and 9. The overall coating thickness growth described above as pictured in FIGS. 8 and 9 which relates specifically to the region of bullet penetration is a result of the liquid-imbibing swelling which occurs specifically in the layer 32b region where bullet penetration of container 24 has occurred.

Thus, several different protection mechanisms are illustrated in FIGS. 7, 8 and 9 with respect to the coating 32 behaviors just mentioned above. These mechanisms include overall coating thickness growth, in this case driven by thickening of two different layer regions within coating 32 resulting from liquid imbibing and swelling in layer region 32b, and intumescence popping growth occurring in layer region 32a. Another included mechanism, of course, involves anti-leakage sealing of a puncture wound, such as that caused by bullet 34.

In FIGS. 8 and 9, sooted blanket 30 appears fragmentarily in these two figures to indicate that the sooted-blanket-formation contribution to fire protection, previously described, also takes place with respect to the protective coating shown in FIGS. 7-9, inclusive.

Figure 11:
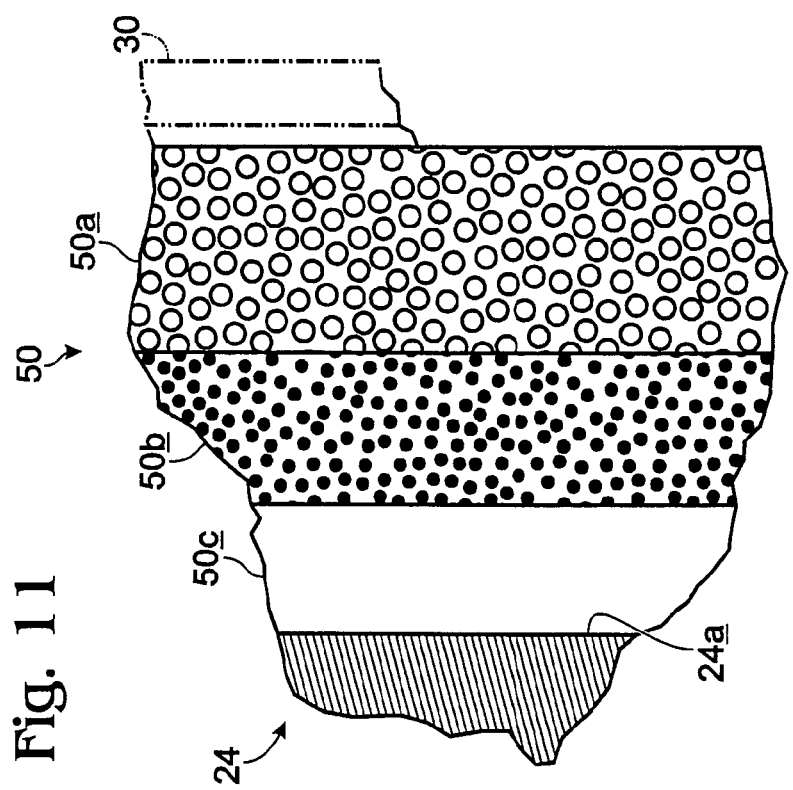
FIG. 11 illustrates still a further embodiment of the invention in which the illustrated protective coating is formed with three layer regions, the outer one of which is made up of a high-elastomeric material carrying an embedded population of intumescence elements, a next, inwardly adjacent layer region which is formed by high-elastomeric material containing an embedded population of liquid-imbiber beads, and an inner layer region which is formed solely of high-elastomeric material.
Figure 10:
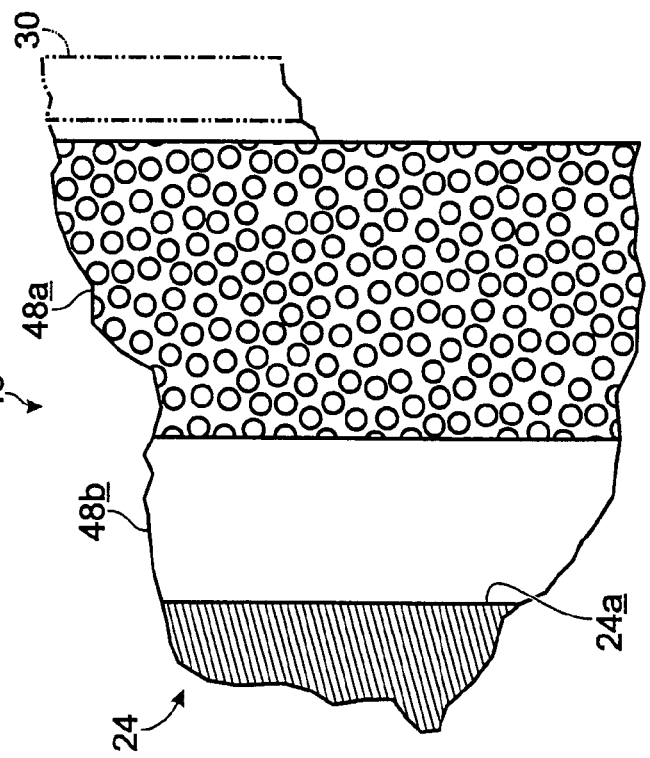
FIG. 10 illustrates still another coating embodiment prepared in accordance with practice of the invention showing a coating which is made up of two different layer regions, including an outer layer region which takes the form of a blend of high-elastomeric material and an embedded population of intumescence elements, and an inner layer region which contains only high-elastomeric material.

FIGS. 10 and 11 show two additional embodiments of the present invention, with FIG. 10 showing another two-layer-region embodiment of the coating of the invention, and FIG. 11 showing a three-layer-region embodiment of such a coating.

In FIG. 10, a coating 48 is shown applied to outside surface 24a of protected structure 24. Coating 48 includes an outer layer region 48a which is like previously described layer region 32a in coating 32, and an inner layer region 48b which is formed completely, and solely, of the same high-elastomeric material discussed above herein. There are no embedded elements in layer region 48b.

Outer layer region 48a behaves in the same manner described earlier for layer region 32a in coating 32. Inner layer region 48b behaves in the manner described above for the elastomeric body portion of previously described layer region 32b in coating 32. The respective thicknesses of layer regions 48a, 48b are matters of designer choice.

FIG. 11 shows a coating 50 which has been spray-applied to outer surface 24a in structure 24. Coating 50 includes an outer layer 50a which, in structure and behavior, is like layer region 32a in coating 32, an intermediate layer region 50b which, in structure and behavior, is like layer region 32b in coating 32, and an inner layer region 50c which, in structure and behavior, is like layer region 48b in coating 48. As was stated just above with respect to the layer regions in coating 48, the respective thicknesses of layer regions 50a, 50b, 50c are completely matters of designer choice.

In each of FIGS. 10 and 11, a phantom, dash-double-dot, fragmentary outline is presented to represent previously described smoke blanket 30 as a reminder that the specific coating structures shown in each of these two figures will produce such a blanket when threatened with a confronting fire.

Thus, several very useful embodiments of a protective barrier coating structure for providing various ones, or all, of the target-surface protections discussed above have been specifically illustrated and described herein. These protective barrier structures are very versatile and easily and inexpensively applied to structural surfaces which have been chosen to be provided with such protections. Coating layer thicknesses may readily be chosen to fit different applications, and to deal with different expected fire and penetration threat conditions. The choices for, and, where appropriate, the relative internal positions and thicknesses of, the several, different types of coating-layer regions described and illustrated herein are large in number.

Accordingly, it is recognized that many variations and modifications of the barrier structure of the invention, beyond those which have been specifically pictured herein, are possible, and it is intended that all such variations and modifications will come within the scopes of the claims to invention set forth below.

We claim:

1. Multi-function, surface-coating-applied barrier structure for furnishing both penetration and fire-threat protection on and over the outside surface of a target structure comprising a high-elastomeric, surface-depth-expansion coating having an inner face bonded to such a surface, and an exposed outer face, and within said coating, one layer region extending to said outer face, formed with a body of elastomeric material containing an embedded distribution of intumescence elements, and another layer region, formed of a blend of (a) the same elastomeric material which forms said body of elastomeric material in said one layer region, blended with (b) an embedded distribution of liquid-imbiber elements, and said elastomeric material and said liquid-imbiber elements each reacts to contact with a petroleum substance with a surface-coating thickness-increasing swelling, and a liquid-contact congealing response.

2. The structure of claim 1, wherein said intumescence elements take the form of sodium silicate crystals.

3. The structure of claim 1, wherein said elastomeric material is structured to react to open flame fire by creating a toward-the-fire-intervening sooted smoke blanket which has a fire-suppression characteristic.

4. The structure of claim 1, wherein said elastomeric material produces a swelling and congealing response to contact with a petroleum substance.

5. The structure of claim 3, wherein said elastomeric material produces a swelling and congealing response to contact with a petroleum substance.

* * * * *